United States Patent Office 3,452,075
Patented June 24, 1969

3,452,075
FLUORESCENT LOWER ALKOXY SUBSTITUTED-α-PHENYL SULFONYL CINNAMONITRILES
Hans Dressler, Monroeville, and Kenneth G. Reabe, Delmont, Pa., assignors to Koppers Company, Inc., a corporation of Delaware
No Drawing. Continuation-in-part of application Ser. No. 433,216, Feb. 15, 1965. This application June 14, 1966, Ser. No. 557,383
Int. Cl. C07c *121/50;* C09k *1/00*
U.S. Cl. 260—465    4 Claims

ABSTRACT OF THE DISCLOSURE

Phenylsulfonyl cinnamic-type compounds, which exhibit fluorescence when exposed to ultraviolet light, are specific methylenedioxy or di-lower alkoxy phenylsulfonyl cinnamonitriles and lower alkyl esters of phenylsulfonyl cinnamic acids having either a methylene dioxy or lower alkoxy radicals.

---

This invention relates to a method for making materials fluorescent when exposed to ultraviolet light. Specifically, it relates to a method for making materials fluorescent through the modification of the surface thereof with certain phenylsulfonyl cinnamic-type compounds which emit a blue fluorescence when exposed to ultraviolet light. This application is a continuation-in-part of my copending application, Serial No. 433,216 filed jointly with Kenneth G. Reabe, February 15, 1965, and now U.S. Patent 3,313,-771.

Organic compounds which fluoresce when exposed to ultraviolet light possess utility when applied as optical bleaches, pigments and sensitizers, and as components in photo-recognition systems for example, in mail sorting or in check reading processes. Organic materials which are fluorescent under ultraviolet light are also useful in the electronics field for use in memory systems for data storage computers, in the color photographic field and for use in acrylic lenses where a material changes color in sunlight and reverts to colorless whenever the light source is removed.

There is no present theoretical basis for predicting whether an organic compound will fluoresce under ultraviolet light. It is therefore not possible to postulate whether or not any specific organic compounds will exhibit fluorescence when exposed to ultraviolet light.

I have found that surprisingly certain organic compounds of the general phenylsulfonyl cinnamic-type, which are substantially colorless in the visible spectrum of light, exhibit a bluish fluorescence when such compounds are exposed to ultraviolet illumination. The phenylsulfonyl cinnamic-type compounds of my invention, when used to modify a substrate surface, are useful especially in view of their solubility in most organic solvents, particularly aromatic solvents, and in that they contain no water soluble groups which would tend to leach the compounds from the substrate surface.

In accordance with the invention, I have discovered that certain organic compounds of the formula:

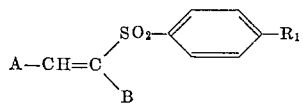

wherein $R_1$ is H or a lower alkyl radical; B is a cyano radical, or a $COOR_2$ radical wherein $R_2$ is a lower alkyl radical; and A is a substituted phenyl radical selected from:

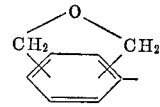

and, when B is a cyano radical:

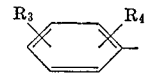

where $R_3$ is H or a lower alkoxy radical and $R_4$ is a lower alkoxy radical, which is ortho or meta to the phenyl linkage when $R_3$ is H, and, when B is a $COOR_2$ radical,

where $R_5$ and $R_6$ are lower alkoxy radicals positioned ortho to each other, are substantially colorless, but emit a blue fluorescence when exposed to ultraviolet light, and when used to modify the surface of a substrate will give to the substrate a bluish fluorescence under exposure to ultraviolet light.

It is surprising to find any general group of compounds which will fluoresce when exposed to ultraviolet light, but the phenylsulfonyl cinnamic type compounds of my invention provide such a general group.

The compounds, when comprising a phenylsulfonyl cinnamonitrile structure, are substituted with either a methylenedioxy radical or di-lower alkoxy radicals, or if substiuted by only one lower alkoxy group, such group must be ortho or meta to the phenyl linkage of the cinnamonitrile structure.

However, when the compounds comprise a lower alkyl ester of a phenylsulfonyl cinnamic acid structure the compounds are substituted with either a methylenedioxy radical or are di-lower alkoxy substituted wherein the lower alkoxy radicals are positioned ortho to each other.

In both of the above phenylsulfonyl cinnamic type structures, if the alkoxy substitutions are other than those specified, the compounds do not give the desired fluorescence upon subjection to ultraviolet light.

To evidence the specificity of the structure formula of the compounds of my invention which results in fluorescence, the following analagous compounds were found not to give fluorescence when exposed to the same ultraviolet light. The compounds which did not fluoresce include:

α-phenylsulfonyl cinnamonitrile
p-methoxy-α-(phenylsulfonyl) cinnamonitrile
p-isopropyl-α-(phenylsulfonyl) cinnamonitrile
p-nitro-α-(phenylsulfonyl) cinnamonitrile
m-nitro-α-(phenylsulfonyl) cinnamonitrile
ethyl o,p-dimethoxy-α-(phenylsulfonyl) cinnamate
ethyl o,p-diethoxy-α-(phenylsulfonyl) cinnamate
ethyl o-methoxy-α-(phenylsulfonyl) cinnamate
ethyl o-methoxy-α-(p-tolylsulfonyl) cinnamate
ethyl p-methoxy-α-(phenylsulfonyl) cinnamate
dodecyl p-methoxy-α-(phenylsulfonyl) cinnamate
ethyl p-methoxy-α-(p-tolylsulfonyl) cinnamate
ethyl m,m-dimethoxy-α-(phenylsulfonyl) cinnamate
ethyl m-nitro-α-(phenylsulfonyl) cinnamate
ethyl p-nitro-α-(phenylsulfonyl) cinnamate In contrast, the compounds of my invention are colorless in visible light, but do exhibit a bluish fluorescence when exposed to ultraviolet light. My compounds are readily prepared by the condensation of suitable substituted benzaldehydes with the desired (arylsulfonyl) acetonitriles or the desired lower alkyl (arylsulfonyl) acetates.

Suitable substituted benzaldehyde which may be used in the preparation of the fluorescent compounds of my invention include, but are not limited to, piperonal, o-methoxybenzaldehyde, 2,3-dimethoxybenzaldehyde, 2,4-dimethoxybenzaldehyde, 3,4-dimethoxybenzaldehyde, 3,5-dimethoxybenzaldehyde, o - ethoxybenzaldehyde, 2,3 - diethoxybenzaldehyde, 2,4 - diethoxybenzaldehyde, 3,4 - diethoxybenzaldehyde and 3,5-diethoxybenzaldehyde, o-propoxybenzaldehyde, o-butoxybenzaldehyde and the like.

Suitable phenylsulfonyl-acetonitriles which can be used comprise phenylsulfonyl-acetonitrile, p-tolylsulfonyl-acetonitrile, p-ethylphenylsulfonyl acetonitrile, p-n-propylphenylsulfonyl acetonitrile, p-isopropylphenylsulfonyl-acetonitrile, p-n-butylphenylsulfonyl-acetonitrile, p-sec-butylphenylsulfonyl-acetonitrile, p-tert-butylphenylsulfonyl-acetonitrile and the like.

Suitable lower-alkyl (phenylsulfonyl) acetates comprise methyl (phenylsulfonyl) acetate, ethyl (phenylsulfonyl) acetate, methyl (p-tolylsulfonyl) acetate, methyl (p-ethylphenylsulfonyl) acetate, ethyl (p-tolylsulfonyl) acetate and ethyl (p-ethylphenylsulfonyl) acetate, n-propyl (phenylsulfonyl) acetate, n-butyl (phenylsulfonyl) acetate, n-sec-butyl (phenylsulfonyl) acetate and the like.

The ultraviolet light or "black light" used to check the fluorescence of these compounds had an emission maximum at about 355–365 millimicrons, with about 75 percent of the output between 330 and 385 millimicrons. This excitation source is specific for these compounds since they gave little if any fluorescence under illumination by lamps having emission maxima at 315 millimicrons or 255 millimicrons. Thus, not only is a group of organic compounds provided which are colorless but fluoresce when exposed to ultraviolet light, but this excitation is specific to a range of wave length at about a maximum of 355–365 millimicrons.

The method by which these compounds are applied to a substrate surface to render the substrate or portions thereof fluorescent will vary depending upon the substrate material. The term "apply" as used herein means to place into contact such as adhering the compound to the surface of the substrate through the use of a resin, carrier or solvent, or other methods whereby the compounds are brought into contact with the substrate surface to cause the substrate to fluoresce when exposed to ultraviolet light.

For example, if portions of the substrate are to be made fluorescent, so as to mark or distinguish various portions thereof, the compounds are mixed with a suitable organic solvent and added to an ink formulation which will act as a carrier to place the compounds on said substrate. Generally, such a carrier comprises a binder dissolved in a solvent. Carriers which are suitable for use with the compounds described herein include any of the organic liquid vehicles known in the art of marking ink manufacturing. These would include any organic liquid which are used to dissolve or fluidize film-forming materials, such as synthetic resins, cellulose resins and the like. Suitable carriers or vehicles useable in such ink formulations are those described in chapter 4, "Ink Vehicle," of the text Industrial Printing Inks, by L. M. Larsen, Reinhold Publishing Corp., 1962. The amount of compound to be added to the ink formulation will vary depending upon the desired result.

In applying the compounds to fabrics, the compounds are dispersed in a bath with a suitable emulsifier. The fabric is then dipped into the bath for a suitable length of time to allow penetration, removed, rinsed, washed, and dried. The fabric then fluoresces when exposed to ultraviolet light and also appears much brighter in ordinary light because the compounds act as optical bleaching agents, or as what are known as "fluorescent brighteners." Such brighteners may be applied in textile mills by dyeing techniques utilizing known methods for fastening of the brightener onto the textiles.

The commercial success of such optical brighteners or fluorescent brighteners is evidenced by the "whiter than white" claims of modern detergents which employ such brighteners.

Such compounds, when used to modify paper material, are employed in a surface coating and result in whiter, brighter stock.

My invention is further illustrated by the following examples:

Example I

A mixture of 3.6 grams (0.02 mole) of (phenylsulfonyl) acetonitrile, 3.0 grams (0.02 mole) of piperonal, as a solvent 10 milliliters of absolute ethanol, and two drops of piperidine as catalyst, was heated at 70–80° C. for 0.5 hour then cooled and filtered to give 5.6 grams of pale yellow crystals, melting point 169–171° C. After crystallization from benzene, the almost colorless crystals melted at 170–171.5° C. The infrared spectrum confirmed the structure of m,p-methylenedioxy-α-(phenylsulfonyl) cinnamonitrile. The compound exhibited a brilliant greenish-blue fluorescence when illuminated by ultraviolet light having an emission maximum of about 355–365 millimicrons. Under the influence of ultraviolet light having an emission maxima of 255 millimicrons and 315 millimicrons the compound did not fluoresce.

Example II

A mixture of 4.9 grams (0.02 mole) of ethyl (phenylsulfonyl) acetate, 3.4 grams (0.02 mole) of 2,3-dimethoxybenzaldehyde, 10 milliliters of absolute ethanol, and two drops of piperidine was held at 70–80° C. for three hours, then evaporated to dryness. The residual oil crystallized slowly. Recrystallization from 95 percent ethanol yielded 4.7 grams of colorless solid, melting point 135–6° C. The infrared spectrum supported the structure ethyl o,m-dimethoxy-α-(phenylsulfonyl) cinnamate. The crystals showed bluish fluorescence under illumination by ultraviolet light.

Example III

A mixture of 3.6 grams (0.02 mole) of (phenylsulfonyl) acetonitrile, 3.4 grams (0.02 mole) of 2,3-dimethoxybenzaldehyde, 20 ml. of absolute ethanol, and two drops of piperidine was held at 70–80° C. for three hours, then cooled and filtered. The filtered solids were recrystallized from 95 percent ethanol to give 4.0 grams of almost colorless crystals, melting point 114–5° C. The infrared spectrum corroborated the structure, o,m-dimethoxy-α-(phenylsulfonyl) cinnamonitrile. The crystals exhibited blue fluorescence under illumination by ultraviolet light.

Example IV

A mixture of 4.9 grams (0.02 mole) of ethyl (phenylsulfonyl) acetate, 3.0 grams (0.02 mole) of piperonal, 10 milliliters of absolute ethanol, and two drops of piperidine was held at 70–80° C. for two hours, then concentrated. The residue was triturated with 95 percent ethanol and filtered to give 2.4 grams of colorless solid, melting point at 104°–7° C. After recrystallization from 95 percent ethanol, the crystals melted at 110–111.5° C. The infrared spectrum confirmed the structure of ethyl m,p-methylenedioxy-α-(phenylsulfonyl) cinnamate. The crystals exhibited blue fluorescence under ultraviolet light.

Example V

A mixture of 3.6 grams (0.02 mole) of (phenylsulfonyl) acetonitrile, 3.4 grams (0.02 mole) of 3,5-dimethoxybenzaldehyde, 15 milliliters of absolute ethanol, and two drops of piperidine was held at 70–80° C. for 0.5 hour then cooled and filtered. The filtered solid was recrystallized from toluene to give 4.1 grams of almost colorless needles, melting point 139–140° C. The infrared spectrum supported the structure 3,5-dimethoxy-α-(phenylsulfonyl) cinnamonitrile. The crystals gave strong blue fluorescence under illumination by ultraviolet light.

Example VI

A mixture of 5.8 grams of 3,4-diethoxybenzaldehyde (0.03 mole), 5.4 grams (0.03 mole) of (phenylsulfonyl) acetonitrile, 20 milliliters of absolute ethanol, and three drops of piperidine was warmed to give a yellow solution. The solution was allowed to stand for two days, then filtered to give 10.3 grams of pale yellow solids, melting point 148–150° C. After recrystallization from toluene, the melting point was 150–151° C. The infrared spectrum was consistent with the structure m,p-diethoxy-$\alpha$-(phenylsulfonyl) cinnamonitrile. The crystals gave a blue fluorescence under illumination by ultraviolet light.

Example VII

A mixture of 2.7 grams (0.015 mole) of (phenylsulfonyl) acetonitrile, 2.5 grams (0.015 mole) of 2,4-dimethoxybenzaldehyde, 20 milliliters of absolute ethanol, and three drops of piperidine was warmed to obtain a clear solution. The solution was allowed to stand overnight then filtered to give 4.0 grams of pale yellowish solid, melting point 157–9° C. The infrared spectrum confirmed the structure o,p-dimethoxy-$\alpha$-(phenylsulfonyl) cinnamonitrile. The crystals showed blue fluorescence under ultraviolet light.

Example VIII

A mixture of 5.3 grams (0.025 mole) of (phenylsulfonyl) acetonitrile, 20 milliliters of toluene, 4.0 grams (0.025) of ortho-ethoxy benzaldehyde, and two drops of piperidine was heated at about 100° C. for four hours and then concentrated. The residue was recrystallized from toluene to give 5.0 grams of pale yellowish solids, melting point 129–131° C. The infrared spectrum supported the structure o-ethoxy-$\alpha$-(phenylsulfonyl) cinnamonitrile. The crystals exhibited blue fluorescence under the influence of ultarviolet light.

Example IX

A mixture of 4.0 grams (0.03 mole) of meta-methoxybenzaldehyde, 5.4 grams (0.03 mole) of phenylsulfonyl) acetonitrile, 20 milliliters of absolute ethanol, and two drops of piperidine was heated to 60° C. to give a clear solution. The solution was allowed to stand for six hours, then filtered to give 8.6 grams of colorless solids, melting point 131–2° C. The infrared spectrum confirmed the structure m-methoxy-$\alpha$-(phenylsulfonyl) cinnamonitrile. The crystals exhibited blue fluorescence under illumination by ultraviolet light.

In all of the preceding examples, as in Example I, the compounds exhibited fluorescence when exposed to an ultraviolet light lamp having an emission maximum at about 355–365 millimicrons but showed no or very little fluorescence when exposed to an ultraviolet light lamp having an emission maxima at 315 millimicrons and 255 millimicrons.

Example X

A dispersion of product of Example IV, m-methozy-$\alpha$-(phenylsulfonyl) cinnamonitrile with an emulsifier (Emkalar base) in water was brought to a boil and a multifiber cloth (colorless viscose fiber) was immersed in the dispersion for five minutes. The cloth was removed, rinsed, soaped, washed thoroughly, and dried. The viscose fabric, still colorless, showed a brilliant blue fluorescence when exposed to an ultraviolet light having an emission maximum of about 355–365 millimicrons. The m-methoxy-$\alpha$-(phenylsulfonyl) cinnamonitrile also acted as an optical bleaching agent for the viscose fabric.

Example XI

An ink may be formulated by forming a solution of 10 parts of o,m-dimethoxy-$\alpha$-(phenylsulfonyl) cinnamonitrile (Example III), 40 parts of a long oil alkyd printing ink varnish, and 1 part of a drier (metal salt of napthenic acid). The above formulation, printed upon paper or textile material, effect a marking that exhibits blue fluorescence under exposure to ultraviolet light having emission maximum of 355–365 millimicrons.

We claim:

1. The compound characterized by the formula:

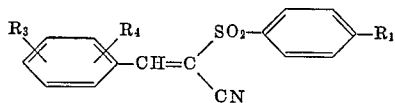

wherein $R_1$ is H or a lower alkyl radical, $R_3$ is H or a lower alkoxy radical and $R_4$ is a lower alkoxy radical, which is ortho- or meta- to the phenyl linkage when $R_3$ is H.

2. The compound 3,5-dimethoxy-$\alpha$-(phenylsulfonyl) cinnamonitrile.

3. The compound 2,4-dimethoxy-$\alpha$-(phenylsulfonyl) cinnamonitrile.

4. The compound 2,3-dimethoxy-$\alpha$-(phenylsulfonyl) cinnamonitrile.

References Cited

UNITED STATES PATENTS 3,159,532  12/1964  Heininger et al. _____ 260—465

FOREIGN PATENTS 613,307  1/1961  Canada.

OTHER REFERENCES

Balasubramanian et al., Journal of the Indian Chemical Society, volume 32, number 8, pp. 493–496, 1955.

CHARLES B. PARKER, *Primary Examiner.*

S. T. LAWRENCE III, *Assistant Examiner.*

U.S. Cl. X.R.

106—20, 163, 168, 170, 178; 117—33.5; 252—8.7, 8.9; 260—45.85, 45.9, 45.95, 348, 470